United States Patent [19]
Waskiewicz

[11] Patent Number: 5,711,618
[45] Date of Patent: Jan. 27, 1998

[54] BEARING ASSEMBLY WITH END CAP

[75] Inventor: Walter P. Waskiewicz, Bristol, Conn.

[73] Assignee: The Torrington Company, Torrington, Conn.

[21] Appl. No.: 757,974

[22] Filed: Nov. 27, 1996

[51] Int. Cl.[6] .......................... F16C 33/76; F16C 23/08
[52] U.S. Cl. .................................... 384/489; 384/495
[58] Field of Search ............................ 384/489, 495, 384/537, 539

[56] References Cited

U.S. PATENT DOCUMENTS

| | | | |
|---|---|---|---|
| 4,054,335 | 10/1977 | Timmer | 384/482 |
| 4,342,490 | 8/1982 | Swinley | 384/489 |
| 4,960,335 | 10/1990 | Otto et al. | 384/484 |
| 5,011,233 | 4/1991 | Nomura et al. | 301/108.1 |
| 5,112,112 | 5/1992 | Baba | 301/108.3 |
| 5,172,984 | 12/1992 | Lederman | 384/489 |
| 5,328,276 | 7/1994 | Linteau | 384/489 X |
| 5,380,103 | 1/1995 | Lederman | 384/489 |

FOREIGN PATENT DOCUMENTS

| | | | |
|---|---|---|---|
| 1989633 | 7/1968 | Germany | 384/489 |
| 2715416 | 10/1978 | Germany | 384/489 |

*Primary Examiner*—Thomas R. Hannon
*Attorney, Agent, or Firm*—John C. Bigler

[57] ABSTRACT

A rolling element bearing is mounted in the bore of a housing, and a hollow end cap is mounted over the bearing. Circumferentially spaced grooves in the bore extend axially partially through the housing from one axial end to facilitate insertion of the bearing. The end cap has a closed wall at one axial end and resilient projections extending axially from its open end, firmly engaging the housing grooves. A strap holder, integral with the end cap, may be provided between the two resilient projections, extending radially outwardly along the axial end of the housing and axially along the housing outer surface and has an opening for mounting a grease fitting. An integral flexible strap extends from the strap holder and has a cover to enclose the grease fitting.

12 Claims, 5 Drawing Sheets

BEARING ASSEMBLY WITH END CAP

BACKGROUND OF THE INVENTION

This invention relates generally to antifriction bearing assemblies. More particularly, this invention is a bearing assembly with a novel end cap to be used if the bearing housing does not have a grease fitting and a novel one-piece combination end cap and grease fitting cover to be used if the bearing has a grease fitting.

Previous end cap utilization has been primarily to exclude contamination from bearings used in very dirty environments. With the institution of more stringent safety regulations, end caps are being used with increasing frequency to provide protection from rotating shafts protruding from the bore of housed bearing units. Such bearing housings may be provided with grease fittings to provide relubrication capability. In that instance, it is advantageous to have a protective cover installed over the grease fitting to protect it from mechanical damage and contamination.

U.S. Pat. No. 4,342,490, issued Aug. 3, 1982 to George Swinley and entitled Bearing Assemblies, describes an end cap providing a protective function and also preventing contamination from entering the bearing. The end cap is provided with lipped lugs that fit into an annular groove on the outside surface of the bearing outer ring. However, the bearing assembly of Swinley requires extensive machining operations to provide the annular groove on the bearing outer ring.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing assembly comprising a housing, a rolling element bearing mounted in an axially extending bore of the housing, and a hollow end cap. Circumferentially spaced grooves in the bore extend axially partially through the housing from one axial end and are adapted to facilitate the insertion of the bearing into the housing. The end cap has a closed wall at one axial end and has resilient projections extending axially from the peripheral edge of its open end firmly engaging the housing grooves.

In another aspect of the invention, a strap holder, integral with the end cap, is provided circumferentially between the two resilient projections. The strap holder extends from the end cap radially outwardly along the axial end of the housing and axially along the housing outer surface and has an opening for a grease fitting. An integral flexible strap extends from the strap holder and has a cover adapted to enclose the grease fitting.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
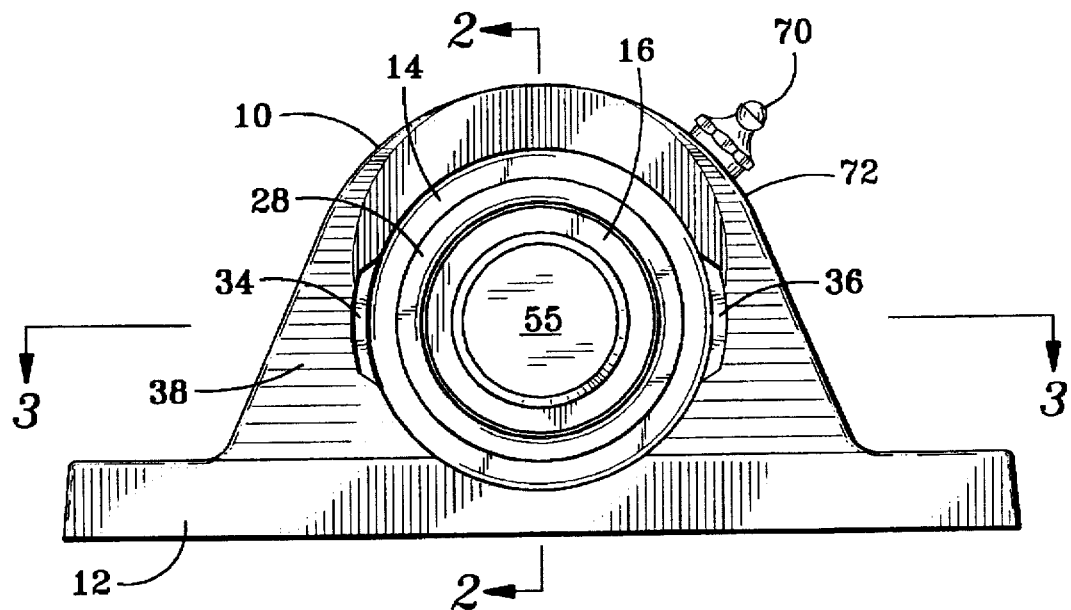
FIG. 1 is a front elevation view illustrating an embodiment of the bearing assembly of the present invention, with the end cap removed.
Figure 2:
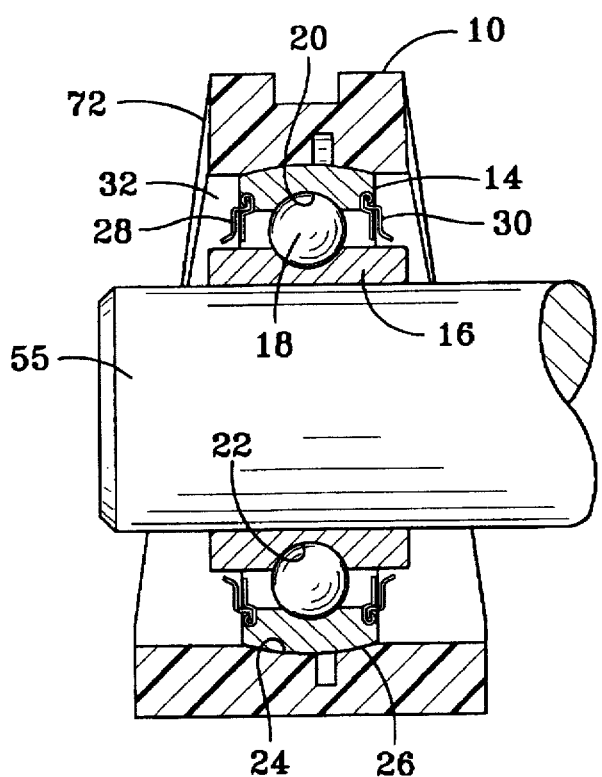
FIG. 2 is sectional view of the bearing assembly of FIG. 1, taken along line 2—2.

Referring now to the drawings, FIGS. 1 and 2 illustrate a bearing assembly having housing 10 with base 12 providing means (shown in FIG. 3) for attaching the bearing assembly to a supporting surface. In this embodiment, housing 10 is of pillow block configuration and includes a ball bearing having outer bearing ring 14, inner bearing ring 16, and balls 18 in rolling contact with outer raceway 20 and inner raceway 22 on the respective bearing rings. Alternatively, other housing configurations and other types of bearings may be used.

Housing 10 has annular concave spherical inside surface 24 slidably retaining annular convex spherical outside surface 26 of outer bearing ring 14 to provide self-alignment. Optional seals 28 and 30 may be mounted at the axial ends of outer ring 14. In order to facilitate the insertion of the bearing into housing 10, bore 32 of housing 10 has two diametrically-opposed grooves 34 and 36, known as loading slots. Grooves 34 and 36 extend axially partially through the housing from axial end surface 38.

Figure 3:
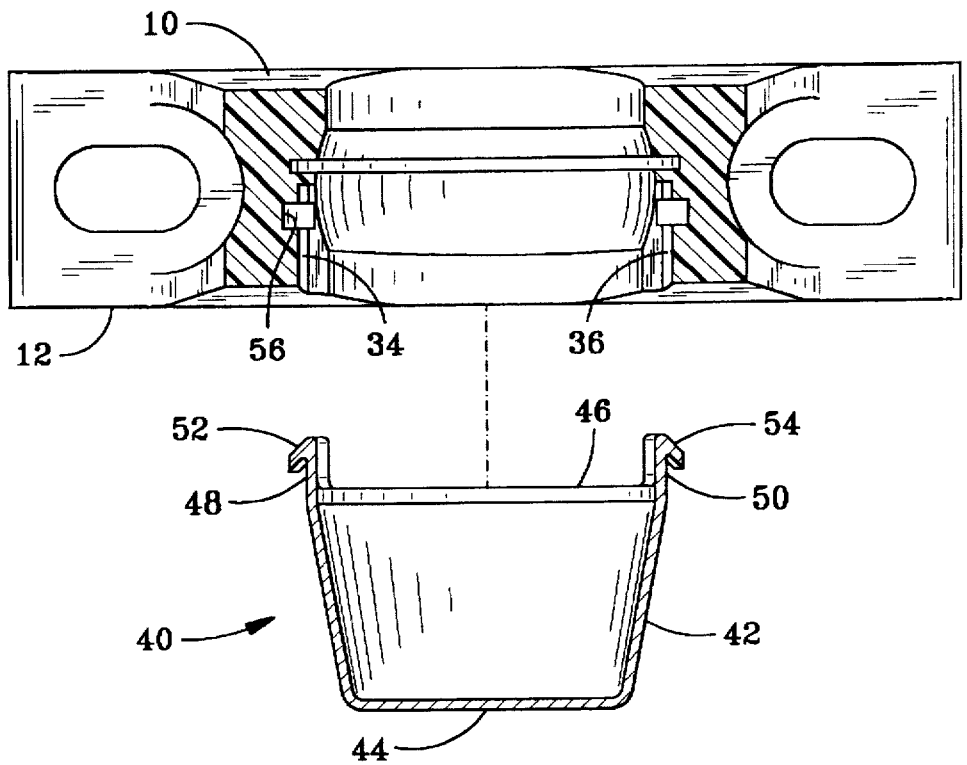
FIG. 3 is a sectional view illustrating an embodiment of the end cap of the present invention and a portion of the bearing housing of FIG. 1, as indicated by the line 3—3.

Referring to FIG. 3, end cap 40 is a one-piece hollow, generally frustum-like configuration pressed out of steel or other metal or formed from polymer material. For example, polypropylene or low-modulus nylon may be used. End cap 40 has conical wall 42 merging with closed end wall 44 at its narrowest end. The opposite end of end cap 40 is open and defined by peripheral edge 46. A pair of diametrically-opposed resilient projections 48 and 50 extend axially from peripheral edge 46 and include fingers 52 and 54, respectively, at their axial ends. Fingers 52 and 54 extend radially outwardly and axially toward closed end wall 44.

In the embodiment of FIG. 3, housing 10 has channel 56 located near the axially inner end of grooves 34 and 36, as shown. Channel 56 and extends radially outwardly and axially outwardly into housing 10. Projections 48 and 50 are resiliently deformed radially inwardly as they are inserted into grooves 34 and 36 and snap radially outwardly into channels 56 to firmly fix end cap 40 over the protruding end of shaft 55, shown in FIG. 1. To release end cap 40, pressure can be applied manually to conical wall 42 to deform the end cap such that projections 48 and 50 move radially inwardly and release fingers 52 and 54 from channels 56.

Figure 4:
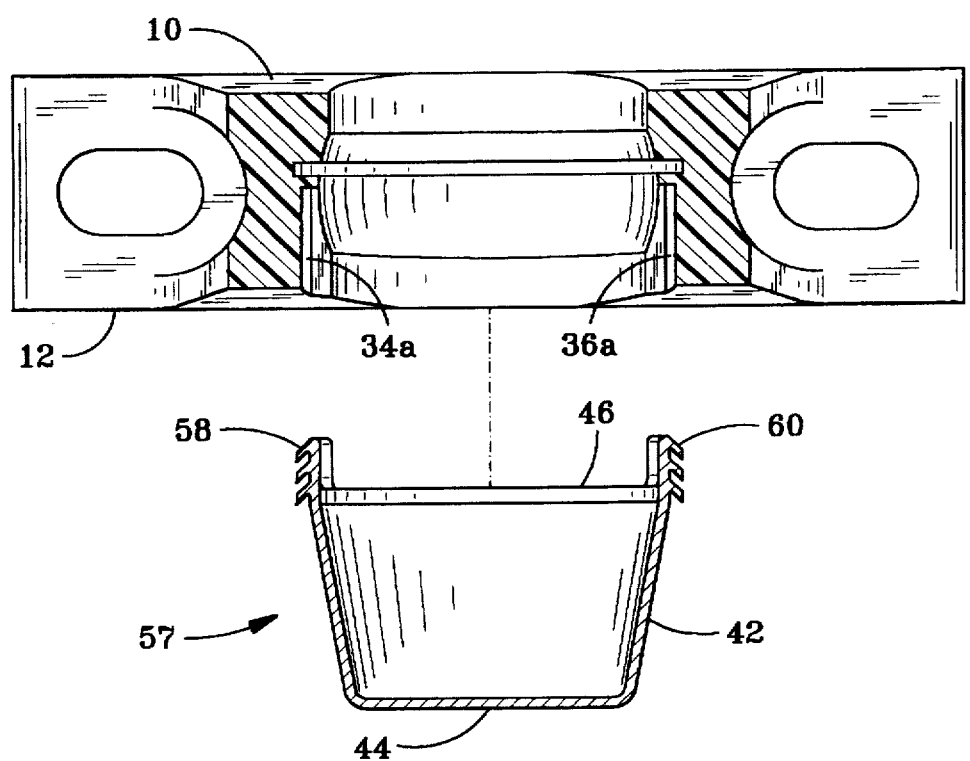
FIG. 4 is a sectional view similar to FIG. 3 illustrating a second embodiment of the end cap of the present invention and a portion of a corresponding bearing housing.

In the embodiment of FIG. 4, projections 48 and 50 are replaced by resilient projections 58 and 60, each having a plurality of barbs, or vanes, extending axially and radially outwardly in their unbiased positions, before projections 58 and 60 are inserted into housing groove 34a and groove 36a. When inserted, the barbs or vanes are deflected radially inwardly by grooves 34a and 36a, and biased against grooves 34a and 36a, such that the end cap is retained by friction. The surface of grooves 34a and 36a may be rough, for example as with cast iron, to enhance this frictional retention.

Figure 5:
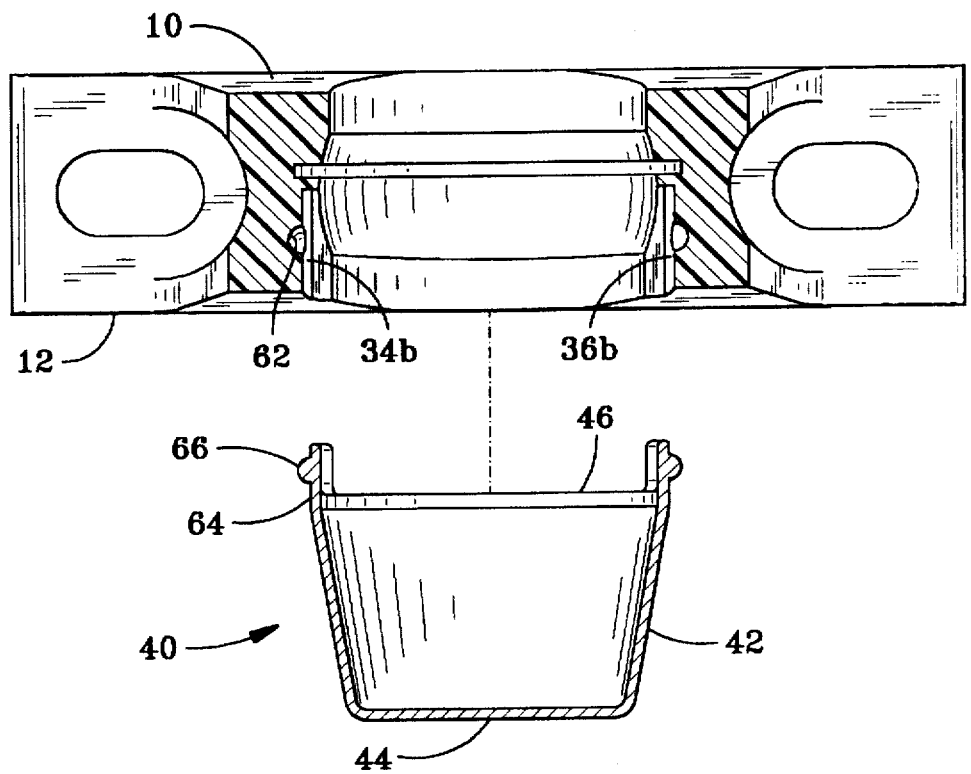
FIG. 5 is a sectional view similar to FIG. 3 illustrating a third embodiment of the end cap of the present invention and a portion of a corresponding bearing housing.

In the embodiment of FIG. 5, housing groove 34b and groove 36b have a centrally located concave recess, such as recess 62. Resilient projections 64 extend axially from peripheral edge 46 and have convex protuberance 66 extending radially outwardly such that convex protuberance 66 is biased into engagement with concave recess 62 to provide a snap-together installation. The end cap can be removed by axially withdrawing it from housing 10 such that convex protuberance 66 is forced radially inwardly by engagement with concave recess 62.

Figure 6:
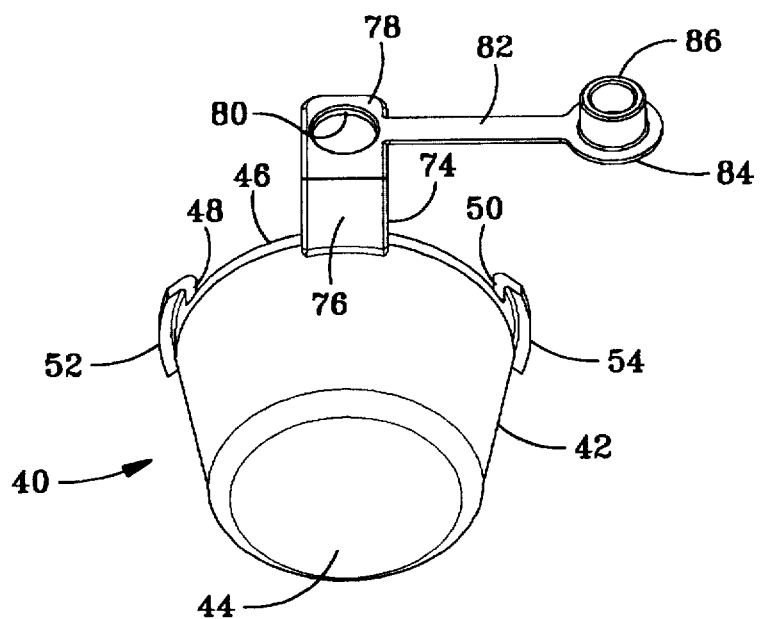
FIG. 6 is a pictorial view illustrating an embodiment of the combined end cap and grease fitting cover of the present invention.

Many bearing assemblies have a grease fitting, such as grease fitting 70 shown in FIG. 1, for example, extending radially outwardly from axially extending outer surface 72 of housing 10. Referring to FIG. 6, a one-piece combination end cap and grease fitting cover is shown for use with bearing assemblies having a grease fitting. The structure of the end cap portion of the embodiment shown is the same as the structure of the end cap embodiment of FIG. 3; however, if desired, the structures of the end cap embodiments of FIG. 4 or FIG. 5 may be used.

Figure 7:
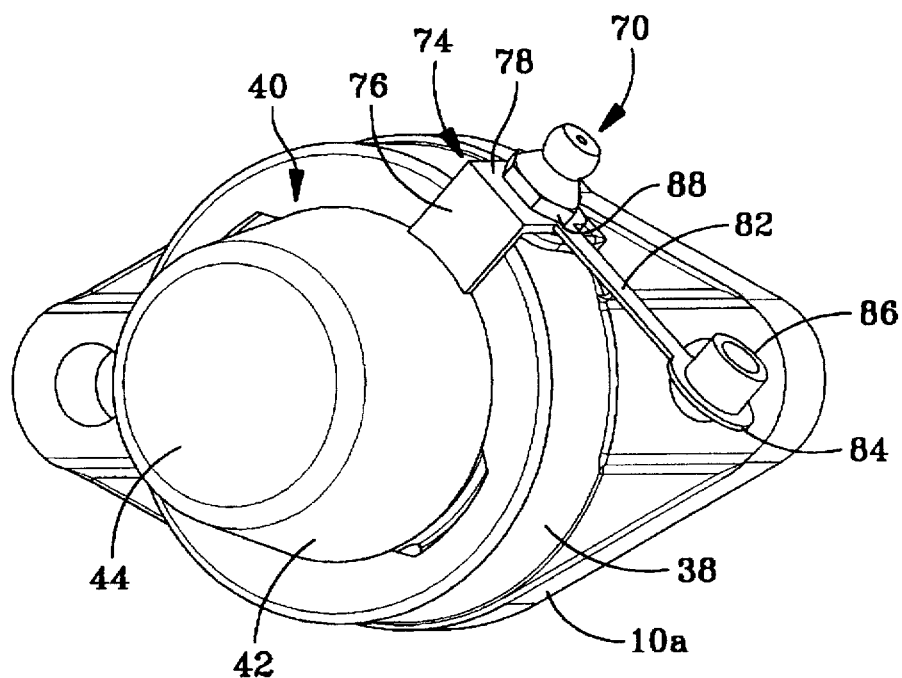
FIG. 7 is a pictorial view of the embodiment of the combined end cap and grease fitting cover of FIG. 6 mounted on a bearing housing.

As shown in FIGS. 6 and 7, resilient strap holder 74 is spaced circumferentially between resilient projections 48 and 50. Strap holder 74 is integral with end cap conical wall 42 at a location spaced a small distance from peripheral edge 46. Portion 76 of strap holder 74 extends radially outwardly along axial end 38 of housing 10, and portion 78 of strap holder 74 extends along housing outer surface 72. The lengths of portions 76 and 78 depend on the particular housing and bearing configurations with which the combination end cap and grease fitting cover is used.

Portion 78 of strap holder 74 is provided with circular opening 80 and integral resilient strap 82 extending from portion 78. The outer end of strap 82 has a flat, circular support 84 supporting a hollow generally cup-shaped protrusion 86. Resilient strap 82 may be bent such that cup-shaped protrusion 86 covers and provides an interference fit with grease fitting 70. Strap holder 74 is held firmly in place by inserting the grease fitting 70 through opening 80 and turning hexagonal nut portion 88 to thread grease fitting 70 into housing 10 (or flange type housing 10a) against portion 78.

Figure 8:
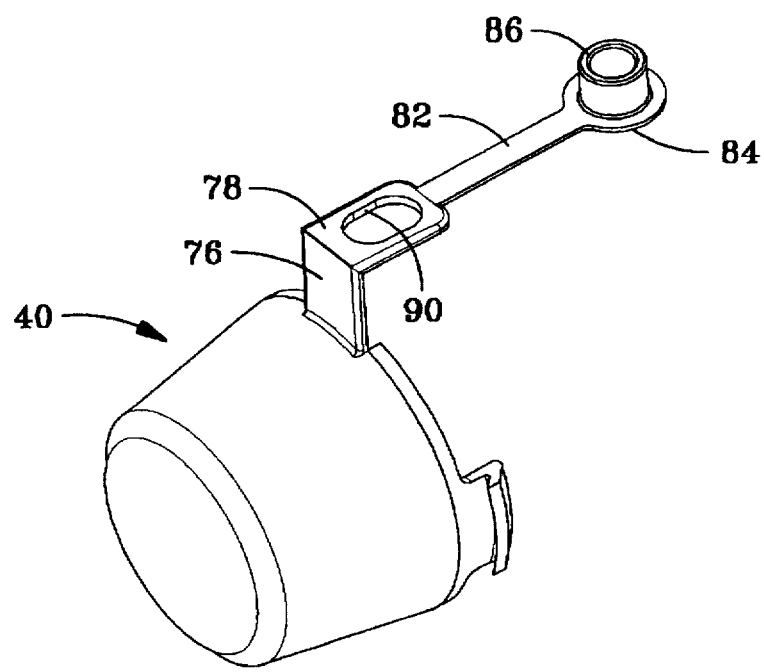
FIG. 8 is a pictorial view illustrating a second embodiment of the combined end cap and grease fitting cover of the present invention.

In the embodiment of FIG. 8, the opening in portion 78 of resilient strap holder 74 is full-sided slot 90, and resilient strap 82 extends from axial free edge 92 of portion 78.

Figure 9:
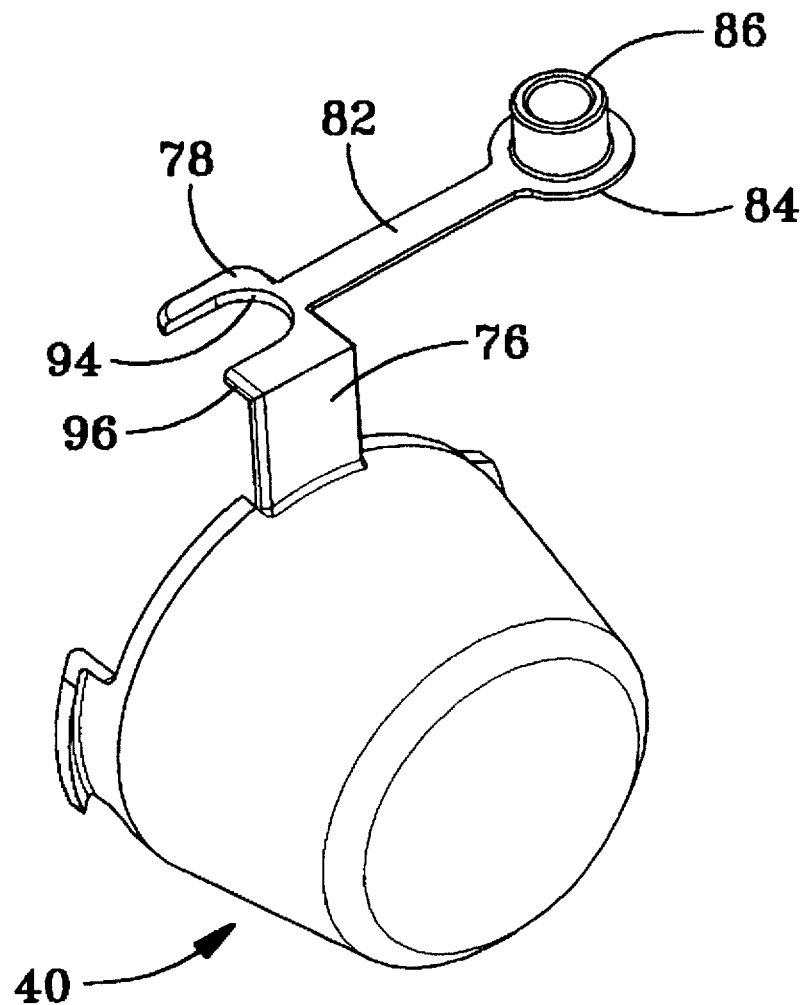
FIG. 9 is a pictorial view illustrating a third embodiment of the combined end cap and grease fitting cover of the present invention.

In the embodiment of FIG. 9, the opening in portion 78 of resilient strap holder 74 is open slot 94 that extends into resilient strap holder portion 78 from axially extending side surface 96. Open slot 94 is positioned under grease fitting 70 by rotating the combination end cap and grease fitting cover with respect to housing 10 (or 10a).

From the above description, it should be apparent that the present invention provides a versatile end cap that may be used with pillow block or flange type housings, either with or without grease fittings. Instead of using a housing with a spherical inside surface and a bearing with a spherical outside surface, as illustrated in the drawings, a housing and bearing with non-spherical surfaces, such as straight cylindrical surfaces, may also be used with the present invention.

Having described the invention, what is claimed is:

1. A bearing assembly comprising:

a housing having an axially extending bore with circumferentially spaced grooves extending axially partially through the housing from one axial end of the housing, the grooves being adapted to facilitate the insertion of a rolling element bearing into the housing;

a bearing mounted in the bore and having inner and outer bearing rings with rolling elements; and a hollow end cap having a closed wall at one axial end, the end cap being provided with resilient projections extending axially from the peripheral edge of the open end of the end cap and firmly engaging the housing grooves;

the housing having a channel located within each of the grooves, extending radially outwardly and axially outwardly into the housing, each projection having a finger at its axial end extending radially outwardly and axially toward the end cap closed wall and fitting into the respective channel.

2. A bearing assembly in accordance with claim 1 wherein the grooves in the housing are two in number, diametrically opposed from each other, and wherein the end cap projections are two in number, each projection firmly engaging a corresponding housing groove.

3. A bearing assembly in accordance with claim 1 wherein the end cap is a one-piece component.

4. A bearing assembly in accordance with claim 1 wherein each projection extends axially and radially outwardly in an unbiased condition and is adapted to be compressed radially inwardly when inserted into the respective groove of the housing.

5. A bearing assembly comprising:

a housing having an axially extending bore with circumferentially spaced grooves extending axially partially through the housing from one axial end of the housing, the grooves being adapted to facilitate the insertion of a rolling element bearing into the housing;

a bearing mounted in the bore and having inner and outer bearing rings with rolling elements; and a hollow end cap having a closed wall at one axial end, the end cap being provided with resilient projections extending axially from the peripheral edge of the open end of the end cap and firmly engaging the housing grooves;

each of the grooves of the housing having a concave recess extending radially outwardly into the housing, and each of the projections having a convex protuberance extending radially outwardly to engage the respective concave recess.

6. A bearing assembly comprising:

a housing having a grease fitting on an outer surface and an axially extending bore with circumferentially spaced grooves extending axially partially through the housing from one axial end of the housing, the grooves being adapted to facilitate the insertion of a rolling element bearing into the housing;

a bearing mounted in the bore and having inner and outer bearing rings with rolling elements;

a hollow end cap having a closed wall at one axial end, the end cap being provided with two resilient projections extending axially from the peripheral edge of the open end of the end cap and firmly engaging said housing grooves; and a strap holder integral with the end cap, located circumferentially between the flexible projections and extending from the cap radially outwardly along the axial end of the housing having the grooves and axially along the housing outer surface of the housing, the strap holder having an opening for the grease fitting.

7. A bearing assembly in accordance with claim 6 wherein the opening in the strap holder is a full-sided elongated slot.

8. A bearing assembly in accordance with claim 6 wherein the opening in the strap holder extends into the axially extending portion of the strap holder from a radially extending side of the strap holder.

9. A bearing assembly in accordance with claim 6 wherein:

the housing has a channel located near the axially inner end of each of the grooves, extending radially outwardly and axially outwardly into the housing; and each projection has a finger at its axial end extending radially outwardly and axially toward the end cap closed wall and fitting into the respective channel.

10. A bearing assembly in accordance with claim 6 wherein each projection extends axially and radially outwardly in an unbiased condition and is adapted to be compressed radially inwardly when inserted into the respective groove of the housing.

11. A bearing assembly in accordance with claim 6 wherein each of the grooves of the housing has a concave recess extending radially outwardly into the housing, and each of the projections has a convex protuberance extending radially outwardly to engage the respective concave recess.

12. A bearing assembly in accordance with claim 6 further comprising a flexible strap integral with the strap holder, extending from the strap holder and having a hollow protrusion adapted to enclose the grease fitting.

* * * * *